Oct. 21, 1958 H. W. LANE 2,857,171
FLUID PRESSURE ACTUATED STABILIZER SYSTEM FOR
VEHICLE SUSPENSIONS
Filed July 2, 1956 4 Sheets-Sheet 1

INVENTOR.
HAROLD W. LANE
BY R. W. Hodgson

FIG. 5

INVENTOR.
HAROLD W. LANE
BY R.W. Hodgson

FIG. 8

INVENTOR.
HAROLD W. LANE
BY R. W. Hodgson

Oct. 21, 1958     H. W. LANE     2,857,171
FLUID PRESSURE ACTUATED STABILIZER SYSTEM FOR
VEHICLE SUSPENSIONS Filed July 2, 1956     4 Sheets-Sheet 4

INVENTOR.
HAROLD W. LANE
BY R.W. Hodgson

United States Patent Office

2,857,171
Patented Oct. 21, 1958

2,857,171

FLUID PRESSURE ACTUATED STABILIZER SYSTEM FOR VEHICLE SUSPENSIONS

Harold W. Lane, Oceanside, Calif.

Application July 2, 1956, Serial No. 595,529

6 Claims. (Cl. 280—112)

Generally speaking, the present invention relates to the vehicle-body suspension art and, more particularly, it pertains to improved apparatus for suspending a vehicle body, such as an automobile body or the like, with respect to multiple supporting and transporting wheels in a manner cooperable to positionally incline the vehicle body with respect to the multiple wheels and an underlying road surface in a manner opposite to the normal inclination of the vehicle body with respect to the multiple wheels and the road surface normally caused by acceleration having a component substantially parallel to the road surface. In one aspect of the present invention such corrective inclination of the vehicle body may be such as to substantially fully compensate for the normally oppositely directed inclination of the vehicle body caused by said acceleration, while in another general aspect of the present invention said corrective inclination of the vehicle body may be of an extent such as to provide overcompensation for the normal inclination of the vehicle body caused by acceleration, thus providing optimum vehicle-handling characteristics and rider-comfort characteristics and also anticipating any further increase in such acceleration—all in a manner tending to minimize the undesirable effects of such acceleration.

At the present time automobile bodies, truck bodies and the like are usually suspended with respect to their multiple supporting and transporting wheels by various spring suspension system, sometimes including hydraulic shock absorbers and the like. Such prior art arrangements employ the spring suspension system primarily to provide a smooth ride capable of compensating for road shocks and the like. However, such prior art suspension systems leave unsolved certain important problems arising primarily from lateral acceleration of the motor vehicle body, such as is produced when the automobile makes an abrupt or sharp turn. This produces lateral acceleration (in this case substantially transverse acceleration substantially at right angles to the direction of travel) which causes the automobile body to roll about a longitudinal roll axis in a highly undesirable manner. This transverse angular rolling about the longitudinal roll axis is undesirable from the standpoint of stability of the automobile itself, since it may cause the automobile to completely turn over or since by reason of uneven tire-against-road-pressure at the inside and outside of the turning automobile, a transverse skid may be caused. Furthermore, from the standpoint of the occupants of the motor vehicle, such transverse acceleration is extremely undesirable since it tends to throw them transversely out of normal position in the motor vehicle body.

Various prior art techniques have been employed in the attempt to correct the above-mentioned situation. One such prior art technique has consisted of the pre-banking of the road surface so that the outer curved edge of the road around a bend is substantially higher than the inner curved edge of the road around said bend, with the road surface therebetween being correspondingly angularly inclined. This appears to correct all of the above-mentioned disadvantages—that is, it greatly reduces the tendency of the motor vehicle to roll over while making a fast tight turn, it greatly reduces the tendency of the motor vehicle to go into a skid during such a fast tight turn, and it also greatly reduces the tendency toward lateral mal-positioning of the occupants of the motor vehicle during such a fast tight turn. Therefore, it would seem that pre-banking a road at such turns would provide a solution to all of the above-mentioned problems. However, such is not the case. Actually, such a pre-banked road provides corrective action of the above-mentioned type and of optimum value only when the motor vehicle traverses the curve at one predetermined speed—at any other speed either above or below said predetermined speed, the corrective action provided by the pre-banked road is either too little or too great. Therefore, it can be seen that such pre-banked roads do not provide the solution to the above-mentioned prior art problems. Furthermore, the pre-banking of such roads involved considerable cost and is, therefore, not widely used at the present time.

Another prior art technique which has been employed in an attempt to wholly or partially solve the above-mentioned problems, has consisted of the effective lowering of the center of gravity of the motor vehicle body and/or the effective raising of the longitudinal roll axis. This has been accomplished by various arrangements of body, wheels, and suspension systems. However, these prior art arrangements only partially solve the problem and physical limitations prevent them from being carried beyond a certain point. For example, it is obvious that the center of gravity of the motor vehicle body cannot be lowered very substantially without reducing road clearance to an undesirable extent with the consequent likelihood of striking and damaging portions of the car along the bottom thereof such as the transmission, differential, crankcase, etc. which may damage the car to the point of rendering it inoperable.

It was the above-mentioned prior art problems which led applicant to conceive the present invention, which is thought to completely overcome all of said problems. Said present invention may be generally described as set forth herein below.

The present invention may include a plurality of translatory fluid motor means effectively adjustably attachable (usually pivotably attachable) between a motor vehicle body and a plurality of vehicle supporting and transporting wheels, with each of said translatory fluid motor means being controllably extendable and retractable. The invention may also include fluid pump means cooperable for pumping and pressurizing a working fluid (in one form this working fluid may comprise a hydraulic liquid and in another form this working fluid may comprise a gaseous medium such as air or the like). The invention may also include fluid circuit means effectively connecting said fluid pump means and said translatory fluid motor means for effectively and controllably extending and retracting same. The invention may also include control valve means effectively positioned between said fluid pump means and said translatory fluid motor means and cooperable for controllably applying pressurized fluid to said translatory fluid motor means in an extending manner and also alternately in a retracting manner. The control valve means may cooperate with the fluid circuit means and the fluid motor means in a first manner to effectively extend the fluid motor means adjacent a first extreme of the vehicle body with respect to the fluid motor means adjacent a second extreme of the body and about an angular inclination axis lying substantially in a plane between said first and second extremes of said vehicle body, and said control valve means may also alternately be cooperable with said fluid circuit means and the fluid motor means in a second manner to effectively extend the fluid motor means adjacent said second extreme of the vehicle body with respect to the fluid motor means adjacent said first extreme of the vehicle body and about said angular inclination axis therebetween. It may also be arranged to do the same thing with respect to third and fourth extremes of the body in one specific embodiment of the invention. The invention may also include lateral acceleration sensing means cooperable to produce an acceleration output signal (usually, although not necessarily an electrical signal) in response to acceleration having a lateral directional component (and usually of a magnitude and sense correlated with the magnitude and direction of the lateral acceleration producing such signal). The invention may also include motor means (usually electrical motor means) controlling said control valve means in response to said acceleration output signal in a manner causing effective extension of the fluid motor means at that extreme of the body in which the direction of lateral acceleration is effective whereby to angularly incline said vehicle body in a direction opposite to the inclination normally caused by said lateral acceleration (said corrective inclination in one form of the invention being of an extent such as to fully compensate for the acceleration-caused normal angular inclination in the opposite direction, and in another form of the present invention being of an extent such as to over-compensate for said acceleration-caused normal angular inclination of the vehicle body in the opposite direction). It may also be arranged to do the same thing with respect to third and fourth extremes of the body in one specific embodiment of the invention.

In one particular form, the present invention may include feedback means responsive to inclining operation of the fluid motor means initiated by said acceleration output signal for effectively neutralizing said acceleration output signal when said corrective inclining operation of said fluid motor means has proceeded to a predetermined degree related to the magnitude of the acceleration producing the acceleration output signal (in one form this may be when full angular compensation has been achieved, and in another form this may be when a certain degree of angular over-compensation has been achieved).

It should be noted that in one form of the present invention, the first and second extremes of the vehicle body mentioned above may be first and second sides thereof, the angular inclination axis may be a longitudinal axis substantially parallel to the length of the vehicle body, and the corrective inclining operation of the fluid motor means may be transverse angular inclination from side to side and about said longitudinal inclination axis.

It should also be noted that in another particular form of the present invention, the first and second extremes of the vehicle body mentioned above may be front and back longitudinal ends thereof, the angular inclination axis may be a transverse axis disposed across the length of the vehicle body, and the corrective inclining operation of the fluid motor means may be in a longitudinal direction about said transverse angular inclination axis. Or the invention may combine both types of correction.

It should also be noted that in one specific embodiment of the present invention the fluid motor means on opposite sides of the angular inclination axis are oppositely operated by means of said control valve means—that is, the fluid motor means on one side of said axis are extended while the fluid motor means on the other side of said axis are retracted, thus facilitating maximum angular inclination with the least vertical displacement of the center of gravity of the motor vehicle body.

In one specific form of the present invention the aforementioned feedback means may be responsive to angular inclination of the vehicle body and may be cooperable for correspondingly neutralizing the acceleration output signal when the vehicle body inclination reaches a predetermined angle related in a predetermined way to the magnitude of lateral acceleration.

From the above description of basic and preferred generic forms of the present invention, it will be apparent to those skilled in the art that virtually all of the hereinbefore mentioned prior art problems and disadvantages are substantially completely met and overcome in and through the use of the present invention.

For example, it is obvious that the present invention, in its first of two basic aspects, may be arranged to completely neutralize the normal roll or pitch of a vehicle body by oppositely angularly inclining said vehicle body, thus providing improved vehicle-handling characteristics and rider-comfort characteristics; and that the second aspect of the present invention provides angular inclination oppositely directed with respect to the normal angular inclination caused by lateral acceleration to an extent such as to over-compensate therefor, thus providing what may be termed a built-in banking characteristic in the motor vehicle body suspension which has the effect of greatly improving vehicle-handling and rider-comfort characteristics and also of anticipating subsequent increases in lateral acceleration, which is highly desirable. Furthermore this type of suspension system has none of the prior art disadvantages mentioned in connection with the prior art use of pre-banked roads and the prior art use of suspensions having lower centers of gravity and higher roll axes. In other words the system of the present invention operates satisfactorily irrespective of the speed at which a turn is taken—that is, irrespective of the magnitude of the transverse acceleration. Furthermore the system of the present invention does not involve lowering of the vehicle body and, therefore, does not produce road clearance problems.

It should also be noted that the present invention is not limited to providing corrective action by built-in banking for a motor vehicle body during tight turns, but also may correct fore and aft pitching about a transverse angular inclination axis such as may occur during rapid initial forward acceleration of a car and during rapid negative acceleration, or stopping, of a car. The present invention may completely compensate for this in its one aspect and its second aspect may provide some measure of over-compensation therefor, thus anticipating increases in such acceleration.

With the above points in mind, it is an object of the present invention to provide an improved vehicle body suspension system adapted to minimize undesirable effects of lateral acceleration on the vehicle body.

It is the further object of the present invention to provide an improved vehicle body suspension system adapted to minimize the undesirable effect of centrifugal force on a vehicle body such as produced during tight turns.

It is the further object of the present invention to provide an improved vehicle body suspension system adapted to minimize the undesirable effects of longitudinal acceleration (such as occur during starting and stopping of a vehicle) on the vehicle body.

It is the further object of the present invention to provide an improved vehicle body suspension system of the type set forth in any or all of the preceding objects which is adapted to position a motor vehicle body in an optimum orientation from the vehicle-handling standpoint.

It is the further object of the present invention to provide an improved vehicle body suspension system of the type set forth in any or all of the preceding objects which is adapted to position a motor vehicle body in an optimum orientation from the rider-comfort standpoint.

It is the further object of the present invention to provide apparatus of the character set forth in any or all of the preceding objects which is of simple relatively fail-safe construction.

Other and allied objects will be apparent to those skilled in the art after a careful perusal, examination and study of the accompanying illustrations, the present specification and the appended claims.

To facilitate understanding, reference will be made to the hereinbelow described figures, in which.

Figures 3, 4:
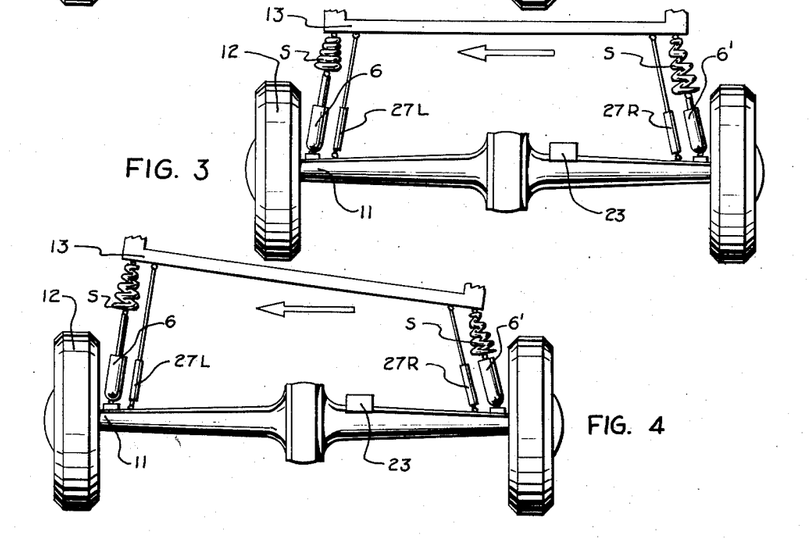
Fig. 3 is a view similar in aspect to Figs. 1 and 2 but shows the fragmentary motor vehicle body while still being subjected to the same leftward acceleration as the fragmentary motor vehicle body in Fig. 2 but shows its corrected re-orientated position caused by corrective inclining operation of the left fluid pump means.
Fig. 4 is a view of aspect similar to Figs. 1, 2 and 3 but shows the other form of the present invention which differs slightly from that shown in Fig. 3 in that the angular inclining operation of the left fluid pump means is such as to overcompensate for the leftward acceleration thus providing maximum vehicle-handling and rider-comfort characteristics and also providing anticipation for any subsequent increases in said leftward acceleration.
Figure 5:
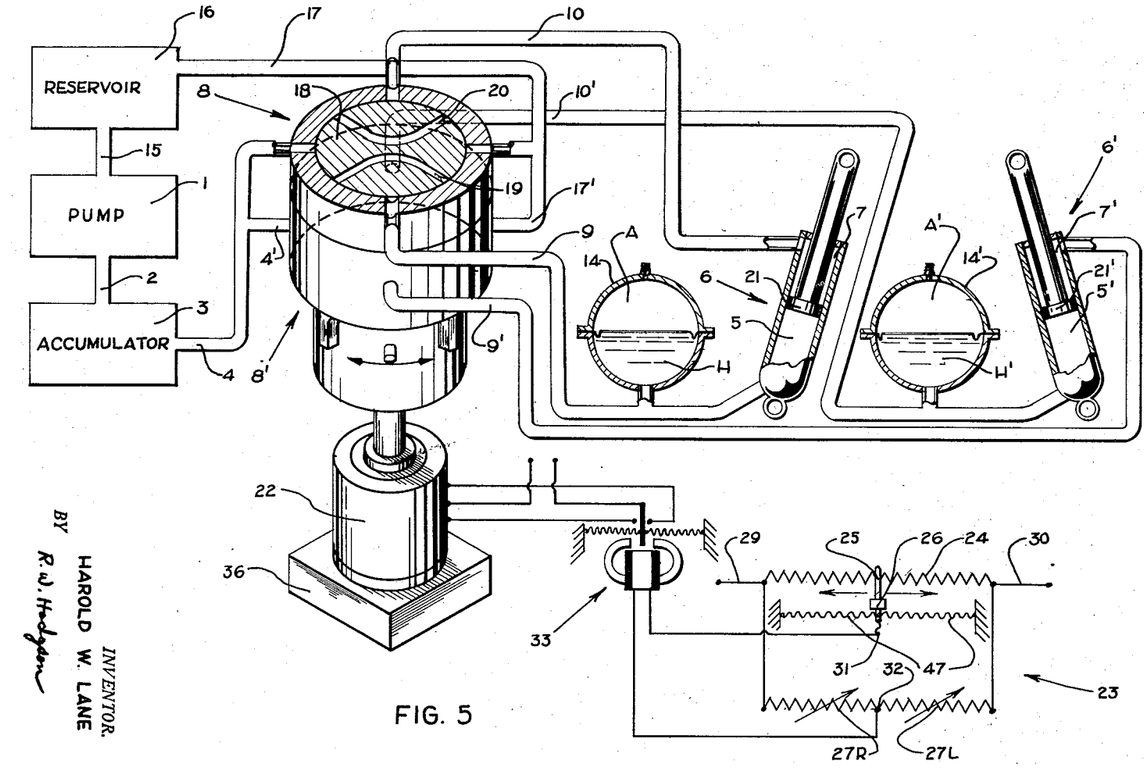
Fig. 5 is a diagrammatic schematic view (partly cutaway and partly in section) of the electrical and fluid circuit means controlling the operation of the fluid motor means in the transverse angular inclination corrective manner illustrated in one form in Fig. 3 and in another form in Fig. 4.

The specific form the present invention illustrated in diagrammatic schematic form in Fig. 5 may be described (for illustrative exemplary purposes only and not to be taken in a limiting sense) as set forth hereinbelow. A pump indicated diagrammatically at 1 is adapted to pump and pressurize a suitable working fluid H, which might, for example, be a hydraulic liquid, although not so limited, by pumping same through outlet conduit 2 to accumulator 3, where a substantial volume of said working fluid is always available under pressure. The working fluid in the accumulator 3 is adapted to be connected through outlet conduit 4 to either the hollow interior 5 at the bottom of the left rear fluid pump means (which in this example comprises a linear actuating cylinder or actuator shown in section for clarity) indicated generally at 6 or to the hollow top 7 thereof, depending upon whether the rotary control valve indicated generally at 8 (which is shown in horizontal section for clarity) connects the conduit 4 to the conduit 9 or the conduit 10. Incidentally, it should be noted that in the position shown in Fig. 5, the rotary valve 8 is in a position which does not connect the conduit 4 to either the conduit 9 or the conduit 10—therefore, the accumulator 3 is not connected to the hollow interior 5 at the lower end of the actuator 6 or to the hollow interior 7 at the upper end of the actuator 6. In other words the control valve 8 is in intermediate position as shown in Fig. 5 effectively locking the hydraulic circuit connected to both ends of the actuator 6, thus also effectively establishing a predetermined length of the link between the axle 11 adjacent the left rear wheel 12 and the corresponding left rear portion of the vehicle body 13 (as can best be seen in the normal position shown in Fig. 1). It should be understood, however, that the hollow chamber 14 (which is shown in section for clarity) acts as a pneumatic shock absorber in that the hydraulic fluid H therein terminates at a level somewhat below the top of the closed chamber 14 whereby to entrap air A therein above the level of the hydraulic fluid H, thus providing an arrangement whereby upward shock transmitted from the road to the left rear wheel 12, as seen in Fig. 3, will effectively shorten the actuator 6 by allowing the hydraulic fluid H to compress the entrapped air A, thereby providing what amounts to an "air cushion," which provides a very smooth and shock-absorbing ride.

It should be noted that the input side of the pump 1 is connected by conduit 15 to a low pressure reservoir or sump 16, which is adapted to at all times maintain a quantity of return hydraulic fluid therein. The reservoir 16 is connected with an input conduit 17, which is adapted to be placed in communication with either the hollow interior 7 at the top of the actuator 6 or the hollow interior 5 at the bottom of the actuator 6 depending upon the position of the rotary control valve 8. In one case the rotary control valve 8 may connect the conduit 17 to the conduit 10. In the other case the rotary control valve 8 may connect the conduit 17 to the conduit 9.

Careful consideration of the above described hydraulic circuit, as shown in Fig. 5 in diagrammatic form, makes it clear that when the control valve 8 is in the position shown in Fig. 5, no extending movement or retracting movement of the actuator 6 will occur (except for slight shock absorbing movement which may be allowed by the compressible air A in the chamber 14 as hereinbefore described). It is also obvious that if the central rotary portion 18 of the control valve 8 is rotated forty-five degrees in clockwise direction from the position shown in Fig. 5, the valve passageway 19 will connect the accumulator 3 to the hollow interior 5 at the bottom of the actuator 6 and that the valve passageway 20 will connect the reservoir 16 to the hollow interior 7 at the top of the actuator 6, thus causing upward or extending movement of the piston 21 of the actuator 6 and effectively lengthening and extending the entire actuator 6, thus inclining the motor vehicle body toward the right, such as is shown in Fig. 4. Incidentally, it should be noted that this some operation may have occurred even when the motor vehicle body is not tipped to the right as in Fig. 4 but is in the position shown in Fig. 3. In this latter case the compensating actuation is just sufficient to offset whatever leftward inclination of the motor vehicle body has been allowed by the various mechanical elements involved, such as the spring S and the compressible air A in the pneumatic shock absorber chamber 14. This.

extending movement of the actuator 6 will terminate whenever the contral rotary portion 18 of the rotary control valve 8 is returned to the position shown in Fig. 5. Means for accomplishing this will be described hereinafter.

It should also be noted that counter-clockwise rotation of the central portion 18 of the control valve 8 from the position shown in Fig. 5 will cause the valve passageway 20 to connect the accumulator 3 and the hollow interior 7 at the top of the actuator 6, and will cause the valve passageway 19 to connect the reservoir 16 to the hollow interior 5 at the bottom of the actuator 6, thus causing retracting movement of the piston 21 and effective shortening of the entire actuator 6 and effectively causing the vehicle body 13 to be leftwardly angularly moved for reverse compensation.

It should be understood that the left front wheel (not shown) and the left front portion (not shown) of the vehicle body 13 are adapted to be effectively connected by an actuator similar to the actuator 6 shown in Figs. 1–4, and that the hereinbefore described operation of the left rear actuator 6 in response to rotary movement of the control valve 8 is equally applicable to said left front actuator for control of side roll of the motor vehicle body. It should be noted that the rotary control valve 8 is mechanically connected to a similar rotary control valve 8', which by means of conduits 4', 9', 17' and 10' effectively connect the right rear actuator 6' (and a similar right front actuator, which is not shown) to the accumulator 4 and the reservoir 17 in a manner similar to that hereinabove described in connection with the hydraulic circuit associated with the left rear actuator 6 (and the left front actuator) except that the positions of the conduits 9' and 10' are reversed with respect to the control valve 8' whereby to cause the actuator 6' to be retracted when the actuator 6 is extended and vice versa. When each of the valve means 8 and 8' are in an intermediate position, both hydraulic circuits are, of course, locked.

It should be noted that reversible electrical motor means 22 (which may comprise a reversible rotary solenoid or electromagnet or the like) is arranged to rotate the two valves 8 and 8' in forty-five degree increments either in clockwise direction or counter-clockwise direction, depending upon the polarity of the signal applied thereto.

It should also be noted that a lower housing 36 is provided and is adapted to carry therein suitable valve centering spring means effectively connected by means of the shaft of the motor 22 to the rotary central member of each of the coupled valve members 8 and 8' whereby to always return them to the intermediate position shown in Fig. 5 whenever the motor means 22 is deenergized. The exact details of construction of said valve centering means is now shown since many such structures are well known in the art, particularly in mounting movable pointer instruments for return to zero position upon de-energization and, furthermore, since this feature does not comprise applicant's inventive concept.

Figures 1, 2:
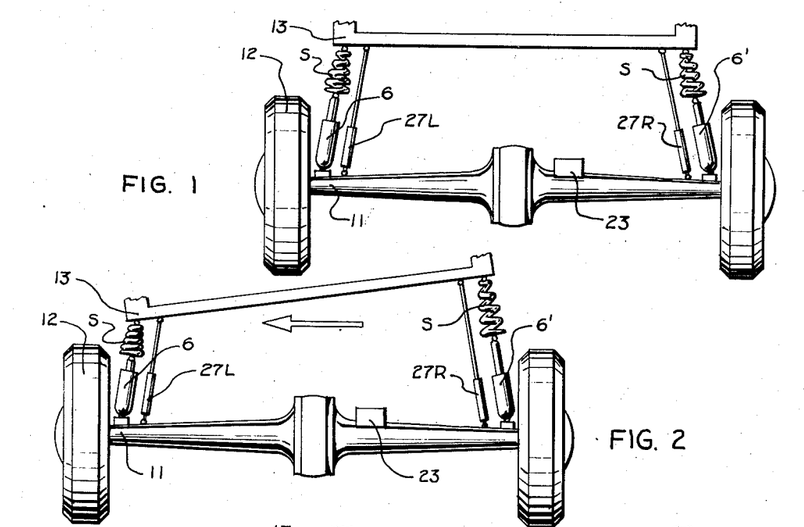
Fig. 1 is an elevational schematic and diagrammatic view of the two rear wheels of a motor vehicle showing in schematic diagrammatic form the fluid pump means effectively connecting said two rear wheels with respect to opposite sides of the rear end of a motor vehicle body (which is shown in broken-away fragmentary form) through the medium of spring means, which are of a schematic diagrammatic nature—in this view the motor vehicle body is vertically orientated in a position such as it would normally assume prior to being subjected to substantial lateral acceleration.
Fig. 2 is a view similar to Fig. 1 but it shows the fragmentary motor vehicle body in a position which it would tend to assume in response to substantial leftward transverse acceleration in the direction of the arrow if it were not for the corrective angular inclining action of the left fluid motor means of applicant's invention.

Lateral acceleration sensing means is indicated generally at 23. It may comprise a Wheatstone bridge consisting of a laterally oriented potentiometer having a transversely mounted resistance element 24 and a transversely slidable contact member 25 constrained to transverse movement only by suitable means (which are not shown since such are well known in the art) and which is normally centered in the position shown by spring means 47 or the like, said contact member 25 provided with a suitable mass 26 whereby to provide in effect a transverse accelerometer or acceleration sensing means. In the example illustrated, the remainder of the Wheatstone bridge is provided by to linear motion variable rheostats 27L and 27R connected together at a central output terminal 32. It should be noted that each of the resistance elements 27L and 27R is adapted to be connected between the wheel axle 11 (or associated elements) and the vehicle body 13 in a manner such that angular inclination of said vehicle body 13 with respect to the axle 11 will vary the resistance of each rheostat 27L and 27R oppositely. For example, movement of the vehicle body 13 into the position shown in Fig. 4 will increase the resistance of 27L and reduce the resistance of 27R. It should also be understood that leftward acceleration of the entire assembly as shown in Figs. 2–4 will move the mass 26 and the contact member 25 toward the left along the resistance element 24. It should be noted that the left ends of the resistance element 24 and the resistance element 27R are adapted to be connected by a lead 29 to one terminal of a suitable source of electrical power (not shown) and that the right ends of the resistance element 24 and the resistance element 27L are adapted to be connected by a lead 30 to the other terminal of said power supply whereby to energize the Wheatstone bridge 23.

It will be understood that leftward movement of the mass 26 and the contact member 25 along the resistance element 24 in response to leftward acceleration of the motor vehicle body will cause an electrical imbalance to exist between the terminals 31 and 32, thus producing an output signal having a sense and magnitude correlated with the magnitude and direction of the acceleration producing same. This acceleration output signal taken from the terminals 31 and 32 may then be used to operate a polarized relay 33 in one direction corresponding to the direction of imbalance, thus causing the polarized relay 33 to energize the driving motor 22 in a corresponding direction, thereby rotating the central members of each of the rotary control valves 8 and 8' in a manner such as to connect their hydraulic circuits whereby to cause the left actuator 6 to extend and the right actuator 6' to retract. This will cause the rheostat 27L to resistively increase and the rheostat 27R to resistively decrease until the Wheatstone bridge becomes balanced again and the acceleration output signal at terminals 31 and 32 has been effectively neutralized. When this occurs, the polarized relay 33 returns to its intermediate position (under the action of a centering spring) which in turn de-energizes the motor 22 and allows the rotary valves 8 and 8' to be automatically returned to the intermediate locked position shown in Fig. 5, under the action of the valve centering spring means previously mentioned. Thus it will be seen that the degree of corrective action of the actuator means is determined by the degree of angular inclination necessary to rebalance the Wheatstone bridge. This can be predetermined to any desired relationship for optimum vehicle-handling and/or driver-comfort characteristics.

Figure 6:
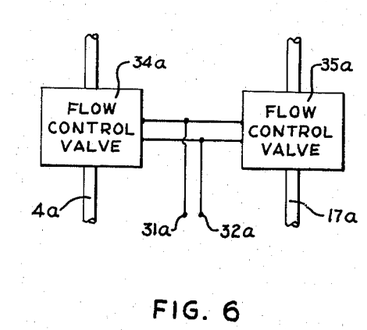
Fig. 6 is a fragmentary view illustrating a slight modification of a portion of Fig. 5 (it may also be similarly applied in Fig. 8 described hereinafter) including flow control valves in the accumulator and reservoir conduits and operable in accordance with the acceleration output signal.

Fig. 6 is a fragmentary view illustrating a slight modification of a portion of Fig. 5 wherein the acceleration output signal taken from the terminals 31a and 32a is also applied to electrically operable control valves 34a and 35a in conduits 4a and 17a whereby the rate of flow of hydraulic fluid in the hydraulic circuits and therefore the rate of corrective extending and retracting operation of the actuators 6 and 6' will be correlated with the magnitude of uncorrected lateral acceleration existing at any given time. It will be understood that when the magnitude of said uncorrected lateral acceleration is great, the electrically operated valves 34a and 35a will have quite large effective apertures and that these will reduce in size in accordance with the magnitude of the uncorrected acceleration existing at any given instance and, therefore, in accordance with the magnitude of the acceleration output signals produced by the terminals 31a and 32a. When said acceleration has been fully corrected and there is no acceleration output signal, said valves 34a and 35a will be completely closed. This provides an arrangement where the rate of corrective action is based upon the extent of error.

It should be noted that the pump 1 may be operated by the engine of the motor vehicle and provided with means for inactivating it whenever the pressure in the accumulator 3 reaches a predetermined value, or it may be provided with means to by-pass the accumulator 3 whenever the pressure therein reaches a predetermined value. Such means are not shown in detail since they are well known in the art and do not comprise the essential inventive concept of applicant's invention. Or the pump 1 may be electrically operated and the electrical motor operating same may be arranged to be inactivated whenever the pressure in the accumulator 3 reaches a predetermined upper value and may be arranged to be re-activated whenever such pressure reaches a minimum predetermined value. The details of such construction are not shown since such details are well known in the art and do not comprise applicant's real invention.

Figure 7:
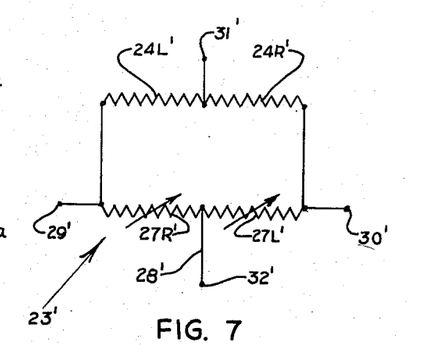
Fig. 7 illustrates a slight modification of the combined acceleration sensing means and feedback means shown in Fig. 5.

Fig. 7 illustrates a slight modification of the combined acceleration sensing means and feedback means indicated at 23 in Fig. 5 and similar reference numerals, primed, however, will be used to indicate similar elements. In this modification the upper resistor 24, the slidable contact 25 and the mass 26, all of which are shown in Fig. 5, are eliminated and two center tapped fixed resistors 24L' and 24R' are used. This has the effect of making acceleration-caused angular inclination of the vehicle body, which effectively varies in opposite directions the resistances of rheostats 27L' and 27R' whereby to produce an acceleration output signal which is capable of operating the reversible motor means 22 and the control valves 8 and 8' in the corrective manner hereinbefore described. It will be understood that corrective inclination of the motor body to a degree such as to fully offset the acceleration-produced inclination, will return the bridge 23' to balanced condition, thereby causing deactivation of the polarized relay, the control valve driving motor, and the return of the control valve means to an intermediate locked position in the general manner hereinbefore indicated.

Figure 8:
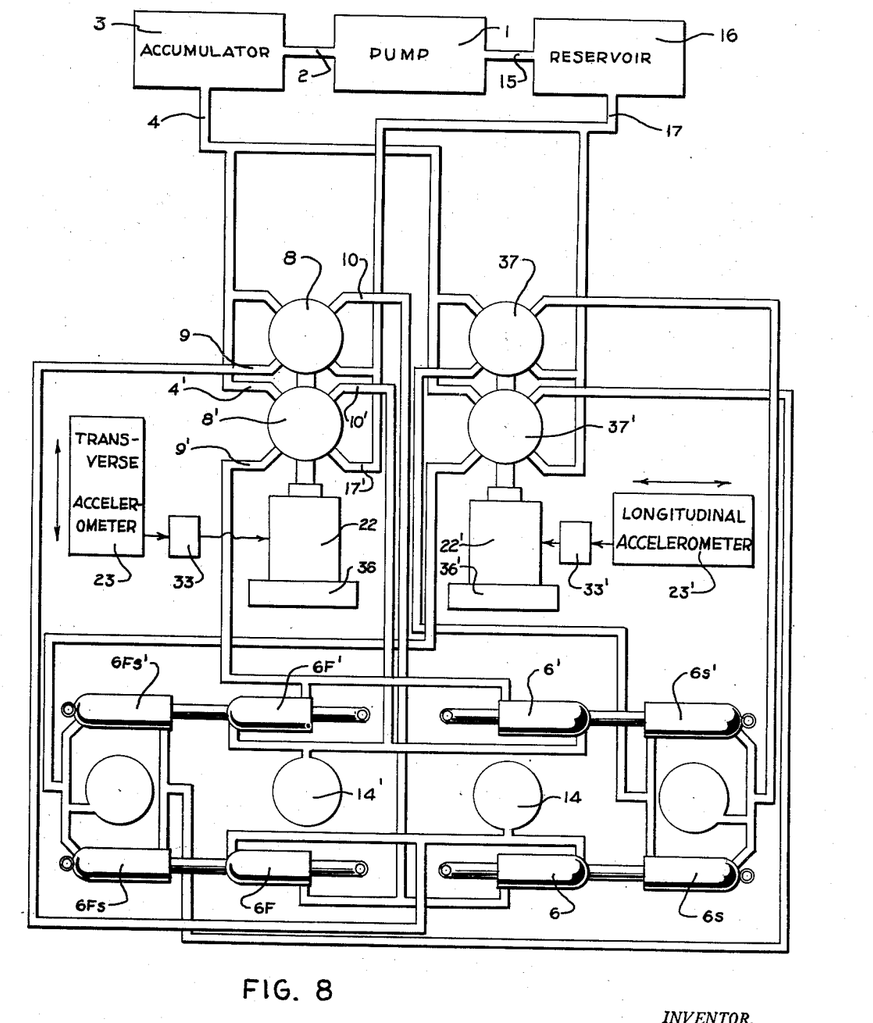
Fig. 8 is a diagrammatic, schematic view quite similar to Fig. 5 except that it illustrates a combination of two such systems for the purpose of controlling transverse angular roll about a longitudinal roll axis and also for controlling longitudinal pitching about a transverse pitch axis.

Fig. 8 is a diagrammatic schematic view quite similar to Fig. 5 except that it illustrates a system including an additional pair of control valve means 37 and 37' (and an additional control valve operating motor 22') similar to the already described pair of control valve means 8 and 8' (and motor 22) shown in Fig. 5. Said additional control valve 37 being adapted to be connected to two rear supplementary rear actuators 6s and 6s' in the same manner that the control valve 8 in Fig. 5 is shown connected to the left rear actuator 6' and the similar left front actuator not shown in Fig. 5, but indicated at 6F in Fig. 8)—said two supplementary actuators 6s and 6s' being in series, respectively, with actuators 6 and 6', thus providing at each rear wheel a composite actuator or translatory fluid motor means capable of operation by either control valve means 8—8' or control valve means 37—37'. Also in the modification shown in Fig. 8 the additional control valve means 37' is adapted to be similarly connected to both the left and right front actuators 6Fs and 6Fs' (which are series connected to 6F and 6F', respectively) in substantially the same manner as the connection of control valve 8' in Fig. 5 to the right rear actuator 6' and the right front actuator (not shown in Fig. 5). This provides an arrangement whereby corrective inclining operation may occur about a longitudinal roll axis to correct for transverse acceleration, and wherein corrective inclining action may occur about a transverse pitch axis to correct for longitudinal acceleration. The operation of this system is thought to be obvious in the light of the above and no further specific description is thought necessary.

It should be clearly noted that while I have chosen to show a combination system in Fig. 8 wherein the fluid motor means adjacent each wheel comprises two series-connected linear actuators controlled by the corresponding control valve of the control valve means in response to the corresponding transverse and/or longitudinal acceleration output signals, respectively, it should be clearly understood that the present invention is not limited to such mechanical series linkage of two actuators to comprise each fluid motor means. Actually each fluid motor means may comprise a single actuator operable by either of the hydraulic circuits (and control valves) for correcting both transverse-acceleration-caused inclination and longitudinal-acceleration-caused inclination.

It should also be noted that the longitudinal inclination corrective system shown as part of Fig. 8 may be employed independently if desired, in which case the system of Fig. 5 would be eliminated from the combination shown in Fig. 8.

Figure 9:
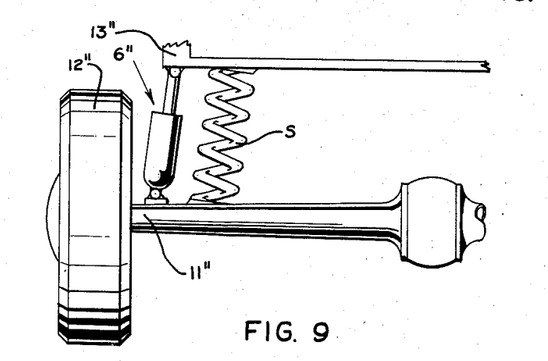
Fig. 9 is a fragmentary view of a slight modification of Fig. 1.

Fig. 9 illustrates in schematic diagrammatic form a portion of the left rear of Fig. 1 in a slightly modified form wherein the actuator 6" by-passes the spring means S.

Figure 10:
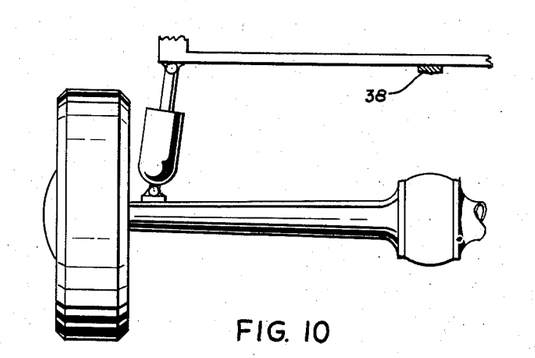
Fig. 10 is a fragmentary view of another slight modification of Fig. 1.

Fig. 10 illustrates in schematic diagrammatic form another slight modification of the left rear portion of Fig. 1 wherein the spring means S has been eliminated entirely.

In order to provide for yieldability in the actuators of Figs. 9 and 10 hollow chambers similar to chambers 14, 14' may be connected to lines 9' and 10.

It should also be noted that, in certain cases, it may be desirable to provide means for establishing a normal average height of the vehicle body at a position between the extreme portions thereof which will be correctively inclined about an angular inclination axis. One illustrative example of such an arrangement is shown in fragmentary form at 38 in Fig. 10, and takes the form of a spring member arranged to be effectively connected between the vehicle body and the underlying wheel-carrying structure in any suitable manner whereby to provide a normal reference clearance therebetween (capable of being temporarily overridden, however, during dynamic road-shock conditions, and the like).

Numerous modifications and variations of the present invention will occur to those skilled in the art after a careful study hereof. All such properly within the basic spirit and scope of the present invention are intended to be included and comprehended herein as fully as if specifically described, illustrated and claimed. For example, it should be obvious that different feedback means other than the Wheatstone bridge 23 may be sometimes employed. Furthermore the Wheatstone bridge arrangement may be dispensed with entirely and the output of the acceleration sensing potentiometer such as that shown at 24, 25, and 26 may be employed to provide a corrective signal producing corrective action based upon the magnitude of said signal directly and without a re-balancing Wheatstone bridge arrangement of the type specifically shown at 23.

Furthermore various types of acceleration sensing means other than the specific potentiometer may be employed within the basic spirit and scope of the present invention. Also various types of feedback means may be employed, other than those shown, in the spirit and scope of the present invention.

It should be understood that the specific form of control valve means, the specific form of the rate of flow valve means, the specific form of the electrical elements involved, the specific form of mountings, etc., are not to be taken in a limiting sense but are employed for illustrative purposes only, it being understood that various other equivalents therefor may be employed within the spirit and scope of the present invention.

It should be noted that the term "translatory fluid motor means" as used herein is intended to mean fluid motor means of a type bringing about effective extension and retraction between its attachment points. This may actually be accomplished by a rotary type motor operating a rotary-to-linear linkage or mechanism—however, the overall result is effective translatory movement, and this is the intended broad construction of the above-mentioned terminology as used herein.

It should also be noted that the word "lateral" as used herein in connection with acceleration merely means that said acceleration has a component lying in some direction in a substantially horizontal plane with respect to the vertical axis of the automobile or vehicle body. Said terminology is not intended to be limited to transverse as used herein.

The exact compositions, configurations, constructions, relative positionings, and cooperative relationships of the various component parts of the present invention are not critical, and can be modified sustantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. In apparatus for effectively resiliently suspending the body of a vehicle with respect to multiple wheels, the provision of body-position-control apparatus cooperable to transversely positionally incline the body with respect to the multiple wheels and an underlying road surface in a manner opposite to the normal transverse angular roll caused by centrifugal-force-produced transverse acceleration, and also cooperable to longitudinally positionally incline the body with respect to the multiple wheels and the underlying road surface in a manner opposite to the normal longitudinal angular inclination of the fore and aft pitching type caused by longitudinal acceleration, comprising; a plurality of translatory fluid motor means effectively adjustably attachable between a vehicle body and plurality of vehicle supporting and transporting wheels, each of said translatory fluid motor means being controllably extendable and retractable; fluid pump means cooperable for pumping and pressurizing a working fluid; fluid circuit means effectively connecting said fluid pump means and said translatory fluid motor means for effectively and controllably extending and retracting same; control valve means effectively positioned between said fluid pump means and said translatory fluid motor means and cooperable for controllably applying pressurized fluid to said translatory fluid motor means in extending and also alternately in a retracting manner, said control valve means cooperating with said fluid circuit means and said fluid motor means in a first manner to effectively extend the fluid motor means adjacent a first side of the body with respect to the fluid motor means adjacent a second side of the body about a longitudinal angular roll axis therebetween, and said control valve means also alternately cooperating with said fluid circuit means and said fluid motor means in a second manner to effectively extend the fluid motor means adjacent said second side of the body with respect to said fluid motor means adjacent said first side of the body about said longitudinal angular roll axis; and said control valve means also being arranged for cooperation with said fluid circuit means and said fluid motor means in a third manner to effectively extend the fluid motor means adjacent a first longitudinal end of the body with respect to the fluid motor means adjacent a second longitudinal end of the body about a transverse angular inclination axis therebetween, and said control valve means also alternately cooperating with said fluid circuit means and said fluid motor means in a fourth manner to effectively extend the fluid motor means adjacent said second longitudinal end of the body with respect to the fluid motor means adjacent said first longitudinal end of the body about said transverse angular inclination axis; lateral acceleration sensing means cooperable to produce a transverse acceleration output signal in response to transverse acceleration, and also cooperable to produce a longitudinal acceleration output signal in response to longitudinal acceleration; motor means controlling said control valve means in response to said transverse acceleration output signal in a manner causing effective extension of the fluid motor means adjacent that side of the body toward which the transverse acceleration is directed thereby transversely angularly inclining said body opposite to the transverse inclination caused by said transverse acceleration, said motor means also controlling said control valve means in response to said longitudinal acceleration output signal in a manner causing effective extension of the fluid motor means at that longitudinal end of the body toward which the longitudinal acceleration is directed thereby longitudinally angularly inclining said body in a direction opposite to the inclination caused by said longitudinal acceleration; and feedback means responsive to transverse inclining operation of the fluid motor means initiated by said transverse acceleration output signal for effectively neutralizing said transverse acceleration output signal when said corrective transverse inclining operation of said fluid motor means has proceeded to a predetermined degree related to the magnitude of the transverse acceleration producing the transverse acceleration output signal, said feedback means also being responsive to longitudinal inclining operation of the fluid motor means initiated by said longitudinal acceleration output signal for effectively neutralizing said longitudinal acceleration output signal when said corrective longitudinal inclining operation of said fluid motor means has proceeded to a predetermined degree related to the magnitude of the longitudinal acceleration producing the longitudinal acceleration output signal.

2. In apparatus for effectively resiliently suspending the body of a vehicle with respect to multiple wheels, the provision of body-position-control apparatus cooperable to transversely positionally incline the body with respect to the multiple wheels and an underlying road surface in a manner opposite to the normal transverse angular roll caused by centrifugal-force-produced transverse acceleration, and also cooperable to longitudinally positionally incline the body with respect to the multiple wheels and the underlying road surface in a manner opposite to the normal longitudinal angular inclination of the force and aft pitching type caused by longitudinal acceleration, comprising: a plurality of translatory fluid motor means effectively adjustably attachable between a vehicle body and plurality of vehicle supporting and transporting wheels, each of said translatory fluid motor means being controllably extendable and retractable; fluid pump means cooperable for pumping and pressurizing a working fluid; fluid circuit means effectively connecting said fluid pump means and said translatory fluid motor means for effectively and controllably extending and retracting same; control valve means effectively positioned between said fluid pump means and said translatory fluid motor means and cooperable for controllably applying pressurized fluid to said translatory fluid motor means in extending and also alternately in a retracting manner, said control valve means cooperating with said fluid circuit means and said fluid motor means in a first manner to effectively extend the fluid motor means adjacent a first side of the body with respect to the fluid motor means adjacent a second side of the body about a longitudinal angular roll axis therebetween, and said control valve means also alternately cooperating with said fluid circuit means and said fluid motor means in a second manner to effectively extend the fluid motor means adjacent said second side of the body with respect to said fluid motor means adjacent said first side of the body about said longitudinal angular roll axis; and said control valve means also being arranged for cooperation with said fluid circuit means and said fluid motor means in a third manner to effectively extend the fluid motor means adjacent a first longitudinal end of the body with respect to the fluid motor means adjacent a second longitudinal end of the body about a transverse angular inclination axis therebetween, and said control valve means also alternately cooperating with said fluid circuit means and said fluid motor means in a fourth manner to effectively extend the fluid motor means adjacent said second longitudinal end of the body with respect to the fluid motor means adjacent said first longitudinal end of the body about said transverse angular inclination axis; lateral acceleration sensing means cooperable to produce a transverse acceleration output signal in response to transverse acceleration, and also cooperable to produce a longitudinal acceleration output signal in response to longitudinal acceleration; motor means controlling said control valve means in response to said transverse acceleration output signal in a manner causing effective extension of the fluid motor means adjacent that side of the body toward which the transverse acceleration is directed thereby transversely angularly inclining said body opposite to the transverse inclination caused by said transverse acceleration, said motor means also controlling said control valve means in response to said longitudinal acceleration output signal in a manner causing effective extension of the fluid motor means at that longitudinal end of the body toward which the longitudinal acceleration is directed thereby longitudinally angularly inclining said body in a direction opposite to the inclination caused by said longitudinal acceleration; and pneumatic shock absorber means in effective communication with said fluid motor means for operation during shock-induced shortening movement of said pneumatic motor means.

3. In apparatus for effectively resiliently suspending the body of a vehicle with respect to multiple supporting and transporting wheels, the provision of body-position-control apparatus cooperable to positionally incline the body with respect to the multiple wheels and an underlying road surface in an overcompensating manner opposite to and greater than the normal inclination of the body with respect to the multiple wheels and the road surface caused by acceleration having a component substantially parallel to said road surface, comprising: a plurality of translatory fluid motor means effectively adjustably and pivotally attachable between a vehicle body and a plurality of vehicle supporting and transporting wheels, each of said translatory fluid motor means being controllably extendable and retractable; fluid pump means cooperable for pumping and pressurizing a working fluid; fluid circuit means effectively connecting said fluid pump means and said translatory fluid motor means for effectively and controllably extending and retracting same; control valve means effectively positioned between said fluid pump means and said translatory fluid motor means and cooperable for controllably applying pressurized fluid to said translatory fluid motor means in extending and also alternately in a retracting manner, said control valve means cooperating with said fluid circuit means and said fluid motor means in a first manner to effectively extend the fluid motor means adjacent a first extreme of the body and to simultaneously effectively retract the fluid motor means adjacent a second extreme of the body with respect to an angular inclination axis therebetween, and said control valve means also alternately cooperating with said fluid circuit means and said fluid motor means in a second manner to effectively extend the fluid motor means adjacent said second extreme of the body and to simultaneously retract said fluid motor means adjacent said first extreme of the body with respect to said angular inclination axis; lateral acceleration sensing means cooperable to produce an acceleration output electrical signal in response to acceleration having a lateral directional component, said acceleration output electrical signal being of magnitude and sense correlated with the magnitude and direction of the acceleration producing said signal; motor means controlling said control valve means in response to said acceleration output signal in a manner causing effective extension of the fluid motor means at that extreme of the body in which the direction of acceleration is effective to angularly incline said body in a direction opposite to the inclination caused by said acceleration and to an extent such as to overcompensate therefor; and feedback means comprising together with said acceleration sensing means a Wheatstone bridge means and responsive to inclining operation of the fluid motor means initiated by said acceleration output electrical signal for neutralizing said acceleration output electrical signal when said corrective inclining operation of said fluid motor means has proceeded to a predetermined degree related to the magnitude of the acceleration producing said acceleration output electrical signal.

4. In apparatus for effectively resiliently suspending the body of a vehicle with respect to multiple supporting and transporting wheels, the provision of body-position-control apparatus cooperable to positionally incline the body with respect to the multiple wheels and an underlying road surface in a neutralizing manner opposite to the normal inclination of the body with respect to the multiple wheels and the road surface caused by acceleration having a component substantially parallel to said road surface, comprising: a plurality of translatory fluid motor means effectively adjustably and pivotally attachable between a vehicle body and a plurality of vehicle supporting and transporting wheels, each of said translatory fluid motor means being controllably extendable and retractable; fluid pump means cooperable for pumping and pressurizing a working fluid; fluid circuit means effectively connecting said fluid pump means and said translatory fluid motor means for effectively and controllably extending and retracting same; control valve means effectively positioned between said fluid pump means and said translatory fluid motor means and cooperable for controllably applying pressurized fluid to said translatory fluid motor means in extending and also alternately in a retracting manner, said control valve means cooperating with said fluid circuit means and said fluid motor means in a first manner to effectively extend the fluid motor means adjacent a first extreme of the body and to simultaneously effectively retract the fluid motor means adjacent a second extreme of the body with respect to an angular inclination axis therebetween, and said control valve means also alternately cooperating with said fluid circuit means and said fluid motor means in a second manner to effectively extend the fluid motor means adjacent said second extreme of the body and to simultaneously retract said fluid motor means adjacent said first extreme of the body with respect to said angular inclination axis; lateral acceleration sensing means cooperable to produce an acceleration output electrical signal in response to acceleration having a lateral directional component, said acceleration output electrical signal being of magnitude and sense correlated with the magnitude and direction of the acceleration producing said signal; motor means controlling said control valve means in response to said acceleration output signal in a manner causing effective extension of the fluid motor means at that extreme of the body in which the direction of acceleration is effective to angularly incline said body in a direction opposite to the inclination caused by said acceleration and to an extent such as to fully compensate therefor; and said acceleration sensing means including Wheatstone bridge means and also effectively comprising feedback means responsive to inclining operation of the fluid motor means initiated by said acceleration output electrical signal for effectively acting to neutralize said acceleration output electrical signal when said corrective inclining operation of said fluid motor means has proceeded to a fully corrective degree.

5. In apparatus for effectively resiliently suspending the body of a vehicle with respect to multiple supporting and transporting wheels, the provision of body-position-control apparatus cooperable to positionally incline the body with respect to the multiple wheels and an underlying road surface in an overcompensating manner opposite to and greater than the normal inclination of the body with respect to the multiple wheels and the road surface caused by acceleration having a component substantially parallel to said road surface, comprising: a plurality of translatory fluid motor means effectively adjustably and pivotally attachable between a vehicle body and a plurality of vehicle supporting and transporting wheels, each of said translatory fluid motor means being controllably extendable and retractable; fluid pump means cooperable for pumping and pressurizing a working fluid; fluid circuit means effectively connecting said fluid pump means and said translatory fluid motor means for effectively and controllably extending and retracting same; control valve means effectively positioned between said fluid pump means and said translatory fluid motor means and cooperable for controllably applying pressurized fluid to said translatory fluid motor means in extending and also alternately in a retracting manner, said control valve means cooperating with said fluid circuit means and said fluid motor means in a first manner to effectively extend the fluid motor means adjacent a first extreme of the body and to simultaneously effectively retract the fluid motor means adjacent a second extreme of the body with respect to an angular inclination axis therebetween, and said control valve means also alternately cooperating with said fluid circuit means and said fluid motor means in a second manner to effectively extend the fluid motor means adjacent said second extreme of the body and to simultaneously retract said fluid motor means adjacent said first extreme of the body with respect to said angular inclination axis; lateral acceleration sensing means cooperable to produce an acceleration output electrical signal in response to acceleration having a lateral directional component, said acceleration output electrical signal being of magnitude and sense correlated with the magnitude and direction of the acceleration producing said signal; motor means controlling said control valve means in response to said acceleration output signal in a manner causing effective extension of the fluid motor means at that extreme of the body in which the direction of acceleration is effective to angularly incline said body in a direction opposite to the inclination caused by said acceleration and to an extent such as to over-compensate therefor; feedback means comprising together with said acceleration sensing means a Wheatstone bridge means and responsive to inclining operation of the fluid motor means initiated by said acceleration output electrical signal for neutralizing said acceleration output electrical signal when said corrective inclining operation of said fluid motor means has proceeded to a predetermined degree related to the magnitude of the acceleration producing said acceleration output electrical signal; pneumatic shock absorber means in effective communication with said fluid motor means for operation during shock-induced shortening movement of said fluid motor means.

6. In apparatus for effectively resiliently suspending the body of a vehicle with respect to multiple supporting and transporting wheels, the provision of body-position-control apparatus cooperable to positionally incline the body with respect to the multiple wheels and an underlying road surface in a neutralizing manner opposite to the normal inclination of the body with respect to the multiple wheels and the road surface caused by acceleration having a component substantially parallel to said road surface, comprising: a plurality of translatory fluid motor means effectively adjustably and pivotally attachable between a vehicle body and a plurality of vehicle supporting and transporting wheels, each of said translatory fluid motor means being controllably extendable and retractable; fluid pump means cooperable for pumping and pressurizing a working fluid; fluid circuit means effectively connecting said fluid pump means and said translatory fluid motor means for effectively and controllably extending and retracting same; control valve means effectively positioned between said fluid pump means and said translatory fluid motor means and cooperable for controllably applying pressurized fluid to said translatory fluid motor means in extending and also alternately in a retracting manner, said control valve means cooperating with said fluid circuit means and said fluid motor means in a first manner to effectively extend the fluid motor means adjacent a first extreme of the body and to simultaneously effectively retract the fluid motor means adjacent a second extreme of the body with respect to an angular inclination axis therebetween, and said control valve means also alternately cooperating with said fluid circuit means and said fluid motor means in a second manner to effectively extend the fluid motor means adjacent said second extreme of the body and to simultaneously retract said fluid motor means adjacent said first extreme of the body with respect to said angular inclination axis; lateral acceleration sensing means cooperable to produce an acceleration output electrical signal in response to acceleration having a lateral directional component, said acceleration output electrical signal being of magnitude and sense correlated with the magnitude and direction of the acceleration producing said signal; motor means controlling said control valve means in response to said acceleration output signal in a manner causing effective extension of the fluid motor means at that extreme of the body in which the direction of acceleration is effective to angularly incline said body in a direction opposite to the inclination caused by said acceleration and to an extent such as to fully compensate therefor; said acceleration sensing means including Wheatstone bridge means and also effectively comprising feedback means responsive to inclining operation of the fluid motor means initiated by said acceleration output electrical signal for effectively acting to neutralize said acceleration output electrical signal when said corrective inclining operation of said fluid motor means has proceeded to a fully corrective degree; pneumatic shock absorber means in effective communication with said fluid motor means for operation during shock-induced shortening movement of said fluid motor means.

References Cited in the file of this patent

UNITED STATES PATENTS

| 2,593,040 | Lloyd | Apr. 15, 1952 |
| 2,623,758 | Cruz | Dec. 30, 1952 |
| 2,684,254 | Goss | July 20, 1954 |

FOREIGN PATENTS

| 518,848 | Great Britain | Mar. 8, 1940 |